Sept. 12, 1939.  M. W. GROW ET AL  2,172,470
FISH-SCALING MACHINE
Filed June 2, 1936  4 Sheets-Sheet 1

INVENTORS
Maurice W. Grow
BY John G. Volp
Albert E. Field
their ATTORNEY

Sept. 12, 1939.    M. W. GROW ET AL    2,172,470
FISH-SCALING MACHINE
Filed June 2, 1936    4 Sheets-Sheet 3

INVENTORS
Maurice W. Grow
John G. Volp
BY Albert L. Field
their ATTORNEY

Sept. 12, 1939.  M. W. GROW ET AL  2,172,470
FISH-SCALING MACHINE
Filed June 2, 1936   4 Sheets-Sheet 4
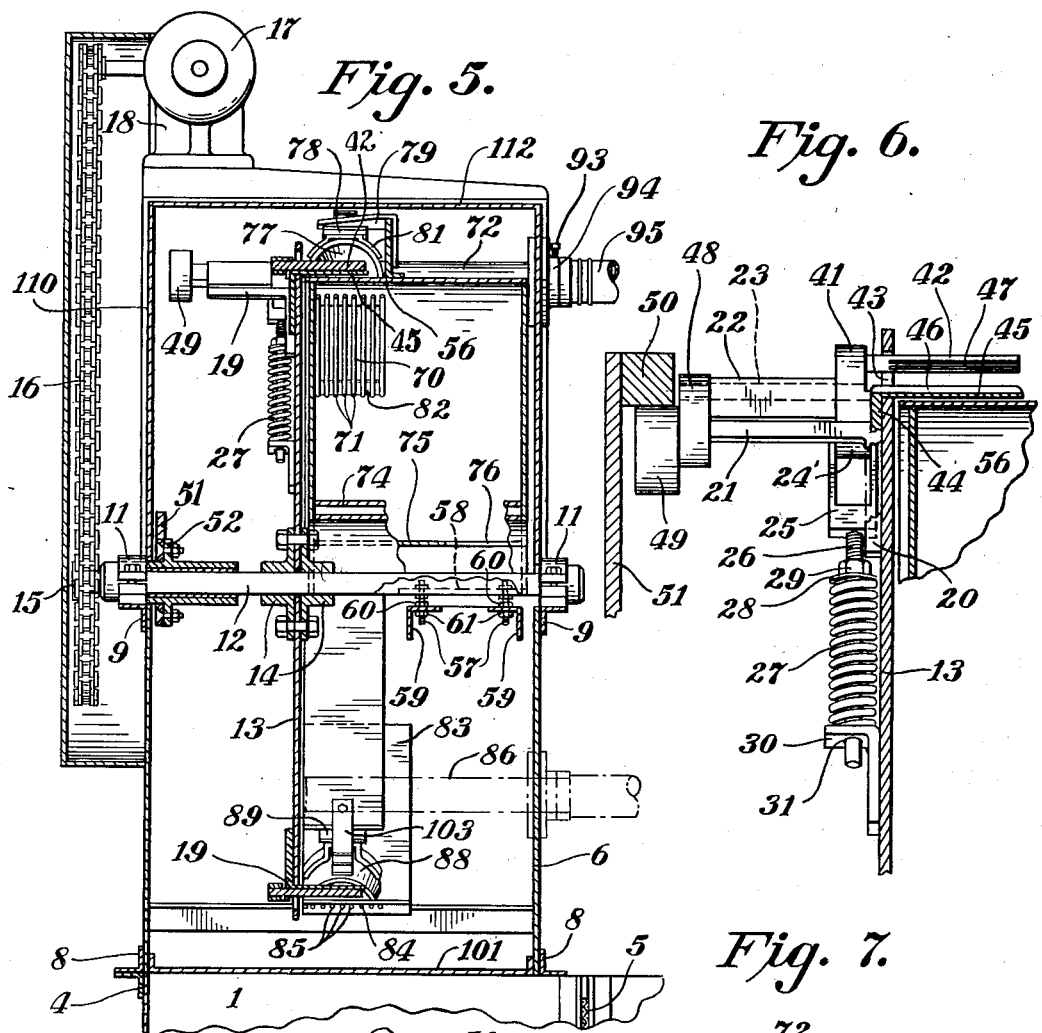
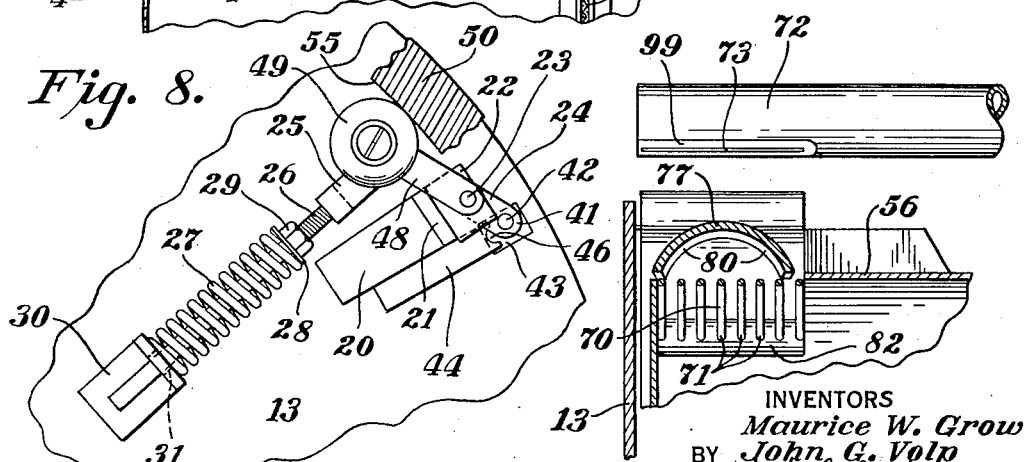
INVENTORS
Maurice W. Grow
BY John G. Volp
Albert E. Field
their ATTORNEY

Patented Sept. 12, 1939

2,172,470

UNITED STATES PATENT OFFICE 2,172,470

FISH-SCALING MACHINE

Maurice W. Grow, Cleveland, and John G. Volp, Lakewood, Ohio, assignors to Grow Bros., Cleveland, Ohio, a partnership consisting of Maurice W. Grow and Walter D. Grow Application June 2, 1936, Serial No. 83,124

15 Claims.  (Cl. 17—5)

This invention pertains to fish scaling machines and more particularly that type using a fluid under pressure to separate the scales from the fish.

One object of our invention is a fish scaling machine practically entirely automatic in operation and simple and compact in construction. We provide novel conveying means for the fish whereby they are carried from a loading station, through the medium of our improved clamping unit, beneath the nozzles where the scales are removed and then to a discharge station where they are discharged into suitable containers. Our invention also contemplates a novel arrangement of supports and guides to direct the movement of the fish as they pass through the machine. Furthermore, the invention includes means for quickly and expeditiously carrying the fluid from the nozzles away from the scaled fish so that it does not interfere with the scaling operation or the functioning of any of the other nozzles. Other objects and advantages of our invention will be referred to in conjunction with the following drawings, in which:

Figure 5 is a transverse vertical sectional view on line 5—5 of Fig. 2.

Figure 6 is a partial view on line 6—6 of Fig. 2 enlarged to show the details of the clamping unit.

Figure 7 is a partial view on line 7—7 of Fig. 4 showing one of the nozzles and part of the guiding and supporting means; and Figure 8 is an enlarged view showing a clamping unit and a portion of the cam track.

Figure 1:
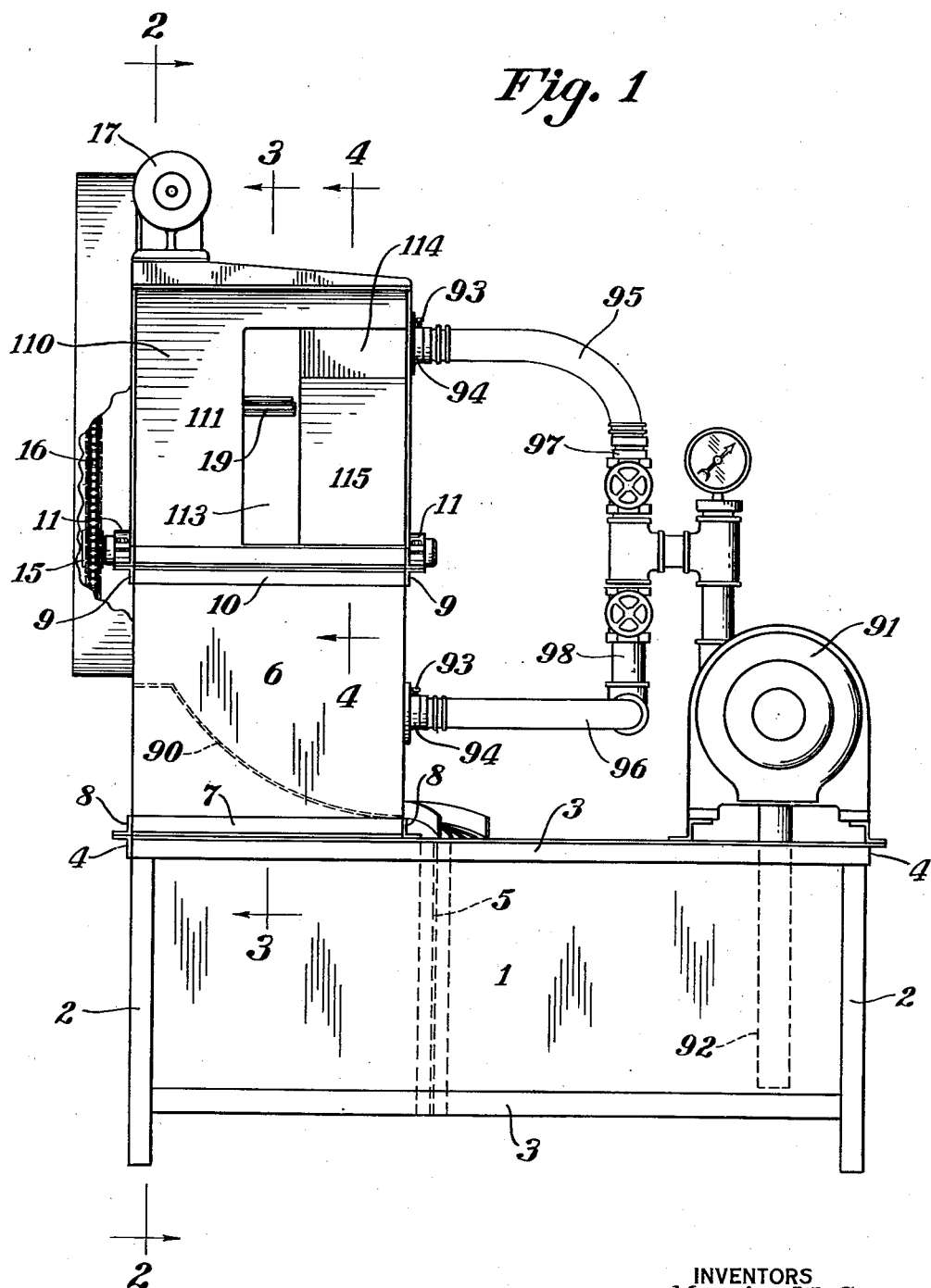
Figure 1 is a front elevation of a machine embodying our invention.

In the drawings a fluid reservoir 1 is formed of suitable upright members 2, longitudinal members 3 and cross braces 4, all shown as angle iron welded or otherwise secured together. The sides and bottom of the framework are covered with sheet metal to form a water-tight structure to receive the fluid, such as water, used to scale the fish. A vertical screen 5 divides the reservoir into two compartments so as to prevent the scales from reaching the intake pipe and clogging the system.

The frame of the reservoir also forms a base for the housing 6 which contains the operating parts. This housing comprises lower members 7, resting on upper longitudinal members 3 of the reservoir, transverse lower members 8, and upper members 9 and 10. Mounted centrally of members 9 are bearings 11 for shaft 12. The conveyor element or disc 13 is secured to the shaft by means of flanged collars 14 bolted to the disc, which are in turn keyed to the shaft. One end of the shaft projects beyond the housing and is provided with sprocket wheel 15 driven through a chain 16 by motor 17 and speed reducing gear 18.

Spaced uniformly around the conveyor disc are the clamping units 19 shown in detail in Figs. 6 and 8. Each unit 19 comprises a base 20 secured to one side of disc 13, having a laterally projecting arm 21. Mounted on arm 21 is a brass or bronze bearing block 22 pivotally supporting a shaft 23. Keyed to one end of shaft 23 is a rocker arm 24, one end 24' of which is pivotally joined to a yoke member 25. The yoke has a threaded hole at one end into which is screwed a rod 26 that acts as a guide for the compression spring 27. One end of the spring bears against washer 28 and nut 29 and the other end is fixedly supported on bracket 30 secured to the conveyor disc. Bracket 30 is formed with an opening 31 receiving the inner end of rod 26.

The other end 41 of rocker arm 24 is provided with a laterally projecting rod 42 which extends through a slot 43 in disc 13. Adjacent the base 20 there is mounted an L-shaped member 44. One arm 45 of the L projects through slot 43 and together with rod 42 forms the gripping means or jaws of the clamp. Arm 45 may be recessed as at 46 to partially receive rod 42 to form a more secure grip for the fish. If desired, the under side of rod 42 may be serrated as at 47, also for this purpose. In order to assure entry of the rod into recess 46 we prefer to machine the adjacent sides of base 20 and member 44 so that the distance between the centers of shaft 23 and rod 42 and between centers of this same shaft and recess 46 will be the same.

Figure 2:
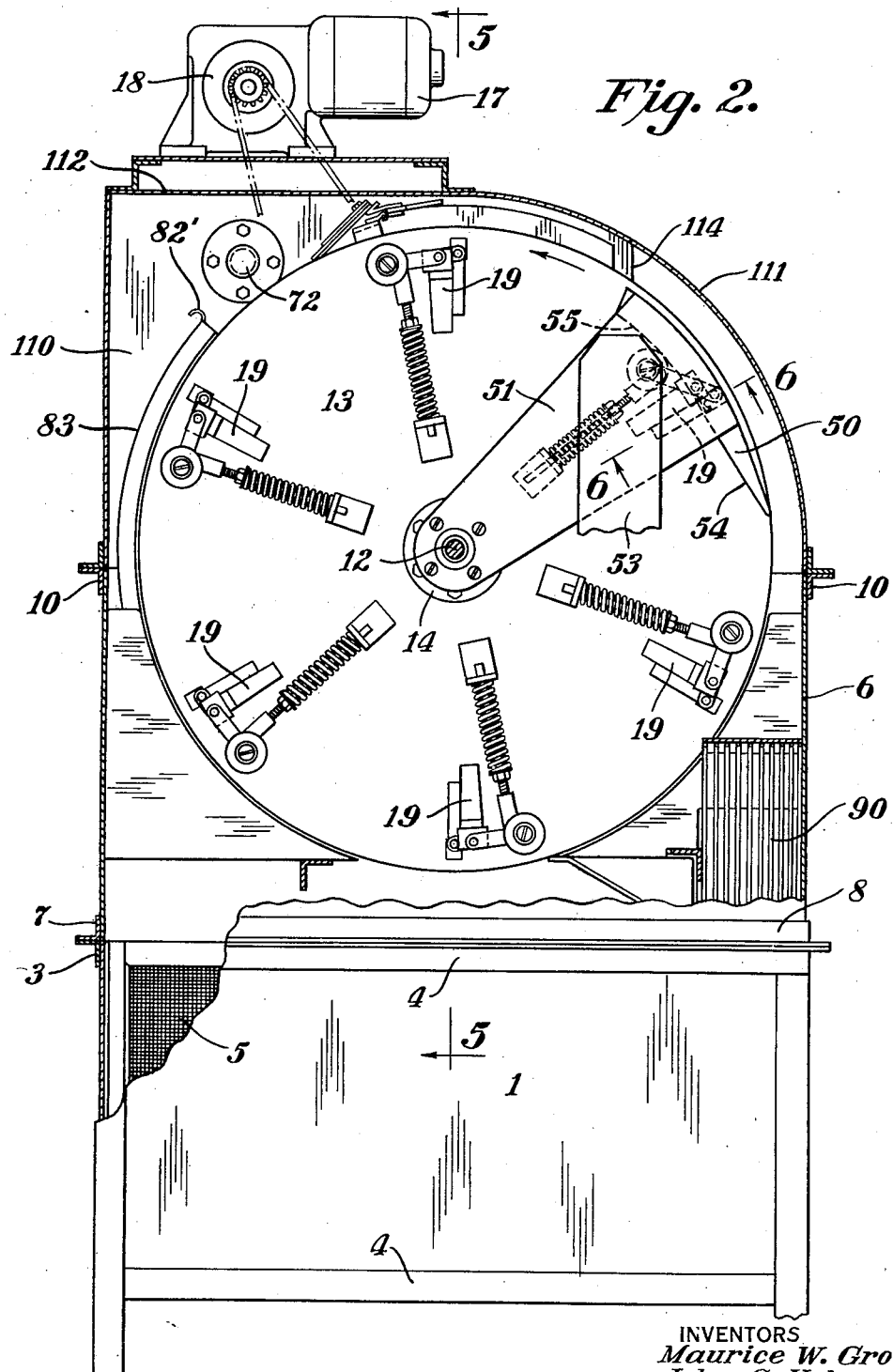
Figure 2 is a view partly in side elevation and partly in vertical section taken on line 2—2 of Fig. 1.
Figure 3:
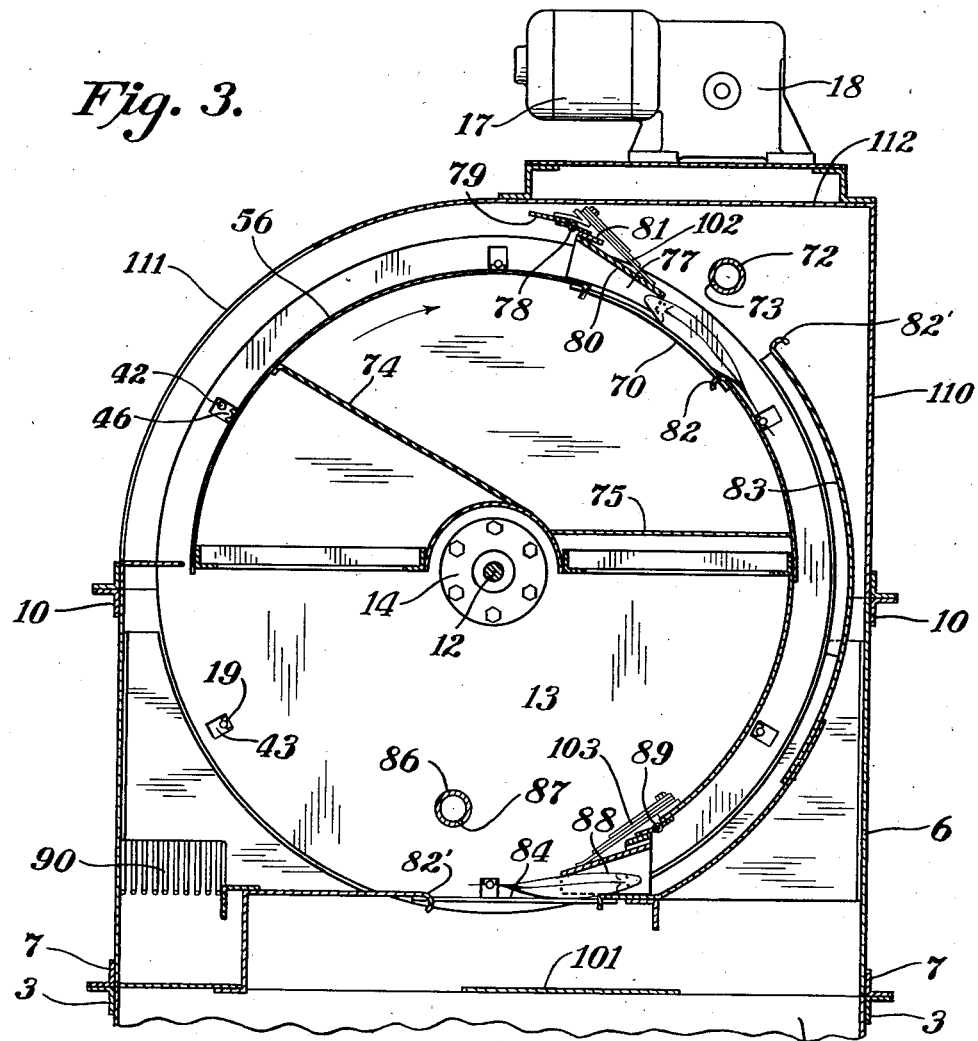
Figure 3 is a view in vertical section taken on line 3—3 of Fig. 1.
Figure 4:
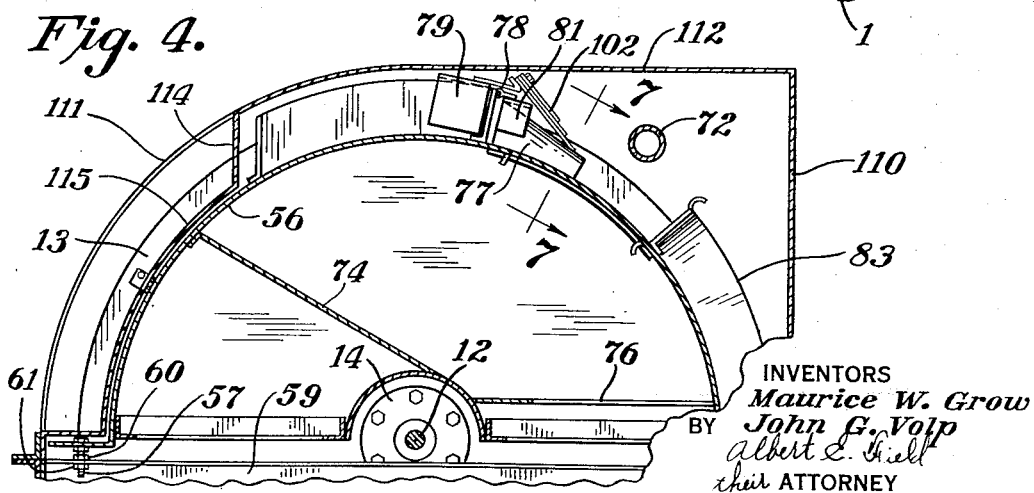
Figure 4 is a partial view in vertical section taken on line 4—4 of Fig. 1.

The clamp is operated by means of an arm 48 keyed at one end to the outer end of shaft 23 and provided at its opposite end with a roller 49. A cam track 50 is held in the path of the roller by means of a segment or cam plate 51 supported at one end on a collar 52 mounted on shaft 12. The segment may be rotated about the shaft until the proper position for opening the clamping unit is determined, after which it may be held by a member 52 fastened to a part of the frame (not shown). As the conveyor disc rotates in the direction of the arrow (Fig. 2) the rollers 49 successively engage the sloping surface 54 of the cam track, which causes arm 48 and shaft 23 to move counter-clockwise (Figs. 2 and 8), causing spring 27 to be further compressed and the jaws 42 and 45 to separate. At this time the tail of a fish may be inserted between the jaws and held in this position until the roller has passed from beneath the circumferential cam surface 55, after which the jaws close by the action of spring 27 and clamp the fish tightly to the conveyor.

To support the fish as they travel over the top part of the machine we provide a track 56 curved about a radius slightly less than the distance between the under sides of arms 45 of members 44 and the center of shaft 12. The track may be adjustable to assure sufficient clearance for smooth operation by providing bolts 57 secured to a flange 58 on the track, which bolts pass through brace members 59 inside housing 6. The bolts and hence the track may be adjusted by nut 60 and held in place by lock nut 61. Such an adjustment may be placed at each end of track 56.

Intermediate the ends of the track is a screen 70 formed of circumferentially extending rods 71. Directly opposite this screen is a nozzle 72 formed with a slot 73, out of which is projected the fluid used to remove scales from the uppermost sides of the fish. The fluid, after the scaling operation, passes through screen 70 and is directed by baffles 74 and 75 to an opening 76 where it falls back into the reservoir for further use. A feature of the screen 70 is that it is free of transversely extending members that if present would be apt to catch on the sides of and mutilate the fish. Our novel screen adequately supports the fish as they pass beneath the nozzle and assures sufficient open space to carry away the fluid and prevent it accumulating beneath the fish and thus interfering with the scaling operation. Furthermore the pressure of the fluid from the nozzles presses the fish into the spaces between rods 71, thus holding them in the center of the track where the force of the stream is most effective.

The fish are guided beneath nozzle 72 by an inverted U-shaped member 77 pivotally mounted at 78 on a bracket 79 secured to track 56. Member 77 may be tapered both laterally and radially as at 80 so as to position the fish centrally of the track and guide them beneath the nozzle. Member 77 may be attached to the hinge 78 through a brace member 81 fastened to the guide member. Spring means such as the leaf spring 102 may be used to force member 77 towards the track and hold the fish in contact therewith as they pass beneath the nozzle.

After passing beneath nozzle 72 the fish are carried to the lower part of the machine and since their weight then tends to throw them outward they are supported by an outer track 83. Both tracks 56 and 83 are bent as at 82 and 82' to protect the fish from mutilation. At its lower end track 83 merges into another screen 84 placed horizontal and formed of rods 85. It will be noted that the unscaled side of the fish is now uppermost, it having been turned upside down in its travel from the upper to the lower portion of the machine. Nozzle 86 is positioned above screen 84 and radially inward of the jaws of the clamp and discharges fluid under pressure through slot 87 to scale this side of the fish. Screen 84 is made horizontal so that the fish will lie flat and not curved as would be the case if the screen were curved concentric to the disc as is screen 70. With such a curved screen the scales on the concave side of the fish would be pressed close together and difficult to remove. By laying the fish flat the scales remain in their normal position and may be readily removed by the fluid from the nozzle. A guide member 88, similar to member 77, is hinged at 89 in advance of nozzle 86 and functions in the same manner as the upper guide. Likewise, spring 103 operates to force guide member 88 towards the track for the same purpose as spring 102.

After passing beneath nozzle 86 the free end of the fish may swing so as to cause the fish to assume a vertical position, at which time the roller of the clamping unit engages surface 54 of the cam track so as to release the clamping means and the released fish slides down a shute 90 into a suitable receptacle.

The water from nozzle 86 passes through the screen directly into the reservoir, although if desired a baffle 101 may be provided on top of the reservoir beneath screen 84 to break the force of the stream and prevent it from churning up the water in the reservoir. It will be noted that the opening 76 is positioned laterally of the machine a sufficient distance so that water dripping through the opening will not interfere with the functioning of the stream from nozzle 86.

The pressure for the water or other fluid is supplied by a motor driven pump 91 which sucks water from the reservoir through intake pipe 92 and delivers it through suitable pipes and fittings to the nozzles. The nozzles may be removably secured to the machine by set screws 93 in collars 94 fastened to the walls of the housings. Flexible hoses 95 and 96 are preferably used to connect the nozzles with the pipes 97 and 98 of the fluid supply system. We have found that fluid pressures of between 50 and 100 pounds per square inch remove the scales very satisfactorily.

The nozzles may be constructed of seamless steel tubing by smoothing a portion of the circumference as at 99 and milling the slots to the proper width and length. In this manner the walls of the slots are made smooth and parallel, with the outer edge thereof sharp so that the fluid is emitted in a fine compact stream.

An upper housing 110 removably attached to housing 6 encases the upper part of the mechanism and confines the fluid to the inside of the machine. The curved wall 111 overlies the conveyor disc and merges with top wall 112. At the front of the machine housing 110 is formed with a slot 113 in line with the path of the clamp jaws and of substantially the same length as the cam track. This constitutes the loading station where the fish are placed between the clamp jaws by the operator. To the right of slot 113 (as viewed in Fig. 1) wall 112 is bent downwardly as at 114 and then continued as a curved surface at 115 so as to provide an offset for easy insertion of the fish.

We have found that the slot in the nozzles should be at an angle of from 7 to 15 degrees to a radial line drawn through the centers of the nozzle and disc to give the best results.

It will thus be seen that we have provided a fish scaling machine of novel and compact construction that is adapted to economically and quickly scale the fish with a minimum of handling and damage thereto.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

What we claim is:

1. In a fish scaling machine, a circular conveyor rotating in a vertical plane, clamping means positioned about the circumference of said conveyor, and a plurality of nozzles adjacent said conveyor and adapted to emit a fluid under pressure to remove scales from the fish.

2. In a fish scaling machine, a conveyor member rotating about a substantially horizontal axis, clamping means on said conveyor spaced from said axis, and a plurality of nozzles adjacent said conveyor and adapted to discharge a fluid under pressure to remove scales from the fish.

3. In a fish scaling machine, a circular conveyor rotating in a substantially vertical plane, clamping means positioned about the circumference of said conveyor, and a pair of nozzles positioned on opposite sides of the path of rotation of said clamping means, said nozzles being adapted to discharge a fluid under pressure to remove scales from the fish.

4. In a fish scaling machine, a circular conveyor rotating in a substantially vertical plane, clamping means positioned about the circumference of said conveyor, a nozzle adjacent said conveyor and adapted to discharge a fluid under pressure to scale one side of the fish, and a second nozzle at a lower level than said first nozzle and adapted to discharge a fluid under pressure to scale the other side of the fish.

5. In a device of the class described a circular conveyor and a track adjacent thereto, means for rotating said conveyor, clamping means on said conveyor having portions thereof extending over said track, and a nozzle spaced radially from the path of said clamping means, said nozzle being adapted to discharge a fluid under pressure to remove scales from the fish.

6. In a fish scaling machine a conveyor for the fish, a track adjacent said conveyor including a screen, a pivoted guide member above said screen adapted to position said fish centrally of said track, and a nozzle adjacent said screen and adapted to discharge a fluid under pressure to remove scales from the fish.

7. In a fish scaling machine a conveyor for the fish, a track adjacent said conveyor including a screen, a pivoted guide member above said screen adapted to position said fish centrally of said track, spring means engaging said member for urging it in the direction of said track, and a nozzle adjacent said screen and adapted to discharge a fluid under pressure to remove scales from the fish.

8. In a fish scaling machine, a conveyor for the fish, means for rotating said conveyor, a track adjacent said conveyor, said track including a screen, a nozzle positioned radially from said screen and adapted to discharge a single thin wall of fluid under pressure to loosen scales from the fish, and to remove scales therefrom and a movable guide member in advance of said nozzle for positioning said fish beneath said fluid discharge.

9. In a fish scaling machine a conveyor for the fish, a track adjacent said conveyor including a screen, a guide member above said screen, a nozzle adjacent said guide member adapted to direct fluid under pressure towards said screen to remove scales from the fish, a second nozzle positioned at a lower level than said first named nozzle, and a guide member adjacent said second nozzle.

10. In a fish scaling machine, a conveyor for the fish comprising a vertically disposed plate adapted to rotate about a horizontal axis, clamping means on said conveyor, said means comprising a shaft on one side of said plate having a pair of arms extending from an end thereof, a clamp jaw extending laterally from one of said arms through said plate and adapted to engage a part of said means on the opposite side of said plate from said shaft, and a spring operatively engaging the other of said arms for urging said jaw towards said part.

11. In a fish scaling machine a conveyor for the fish comprising a vertically disposed plate adapted to rotate about a horizontal axis, a track on one side of said plate, clamping means on said conveyor comprising a movable jaw and a fixed jaw extending through said plate and over said track, a pivoted arm on the opposite side of said plate from said track extending from said movable jaw, spring means operatively engaging said arm for urging said jaws toward each other, and means on said clamping means adapted to engage a part of said machine to separate said jaws at a predetermined point in the travel of said conveyor.

12. In a fish scaling machine, a circular conveyor rotating in a vertical plane, clamping means positioned about the circumference of said conveyor, a plurality of nozzles adjacent said conveyor adapted to emit fluid under pressure to remove scales from the fish, and means pivotally mounted adjacent the periphery of said conveyor in close proximity to each nozzle for positioning the fish centrally with respect to the fluid emitted from the nozzles.

13. In a fish scaling machine, a conveyor member rotating about a substantially horizontal axis, clamping means on said conveyor spaced from said axis, a plurality of nozzles adjacent said conveyor adapted to discharge a fluid under pressure to loosen and remove scales from the fish, and one or more fish guiding means each pivotally mounted with its pivot radially spaced from the periphery of the conveyor to align the fish centrally with respect to the nozzles.

14. In a fish scaling machine, a circular conveyor rotating in a substantially vertical plane, clamping means positioned about the circumference of said conveyor, a pair of nozzles positioned on opposite sides of the path of rotation of said clamping means, said nozzles being adapted to discharge a fluid under pressure to remove scales from the fish, and pivotally mounted means radially spaced from the periphery of said conveyor to align the fish centrally with respect to said nozzles.

15. In a fish scaling machine, a conveyor for the fish, means for moving said conveyor, a track adjacent said conveyor, said track having bent portions, a plurality of bars secured to said bent portions, and means adapted to direct a thin wall of fluid under pressure toward said bars to loosen scales from the fish and to remove scales therefrom.

MAURICE W. GROW.
JOHN G. VOLP.